Figure 1:
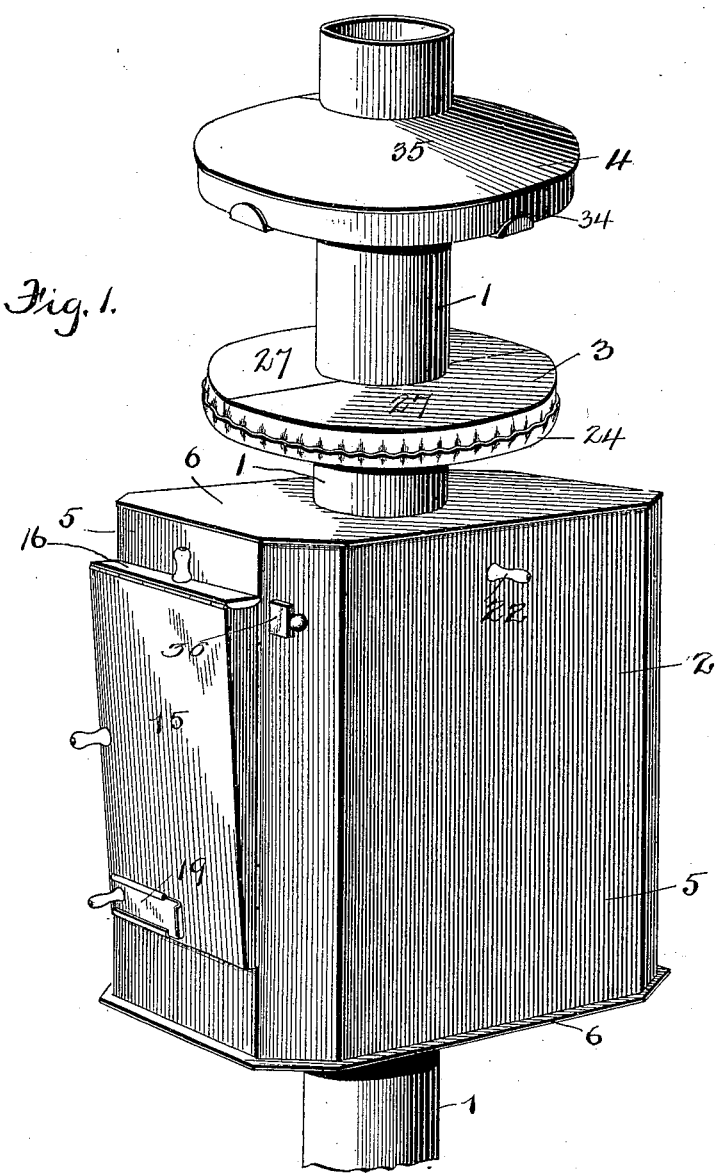

No. 642,693. Patented Feb. 6, 1900.
J. H. HOLLAND.
FRUIT EVAPORATOR.
(Application filed Feb. 23, 1899.)
(No Model.) 3 Sheets—Sheet 1.

Witnesses:
Joseph H. Holland Inventor
By Marion Marion
His Attorneys

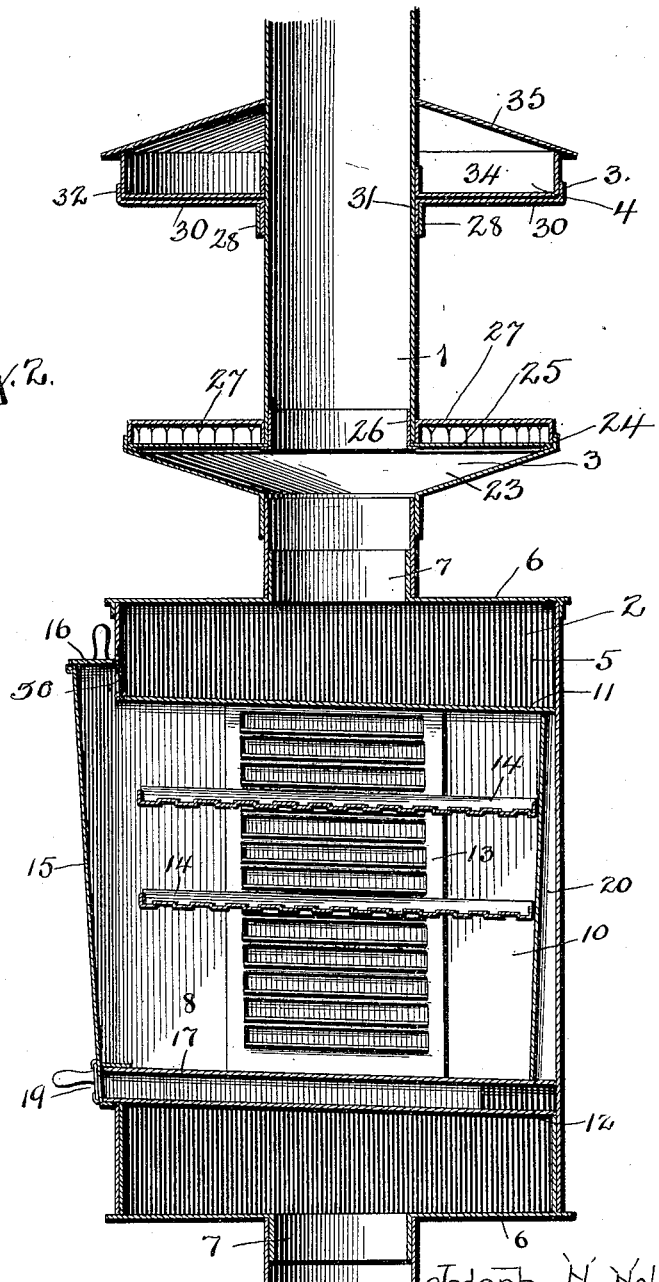

No. 642,693. Patented Feb. 6, 1900.
J. H. HOLLAND.
FRUIT EVAPORATOR.
(Application filed Feb. 23, 1899.)
(No Model.) 3 Sheets—Sheet 3.
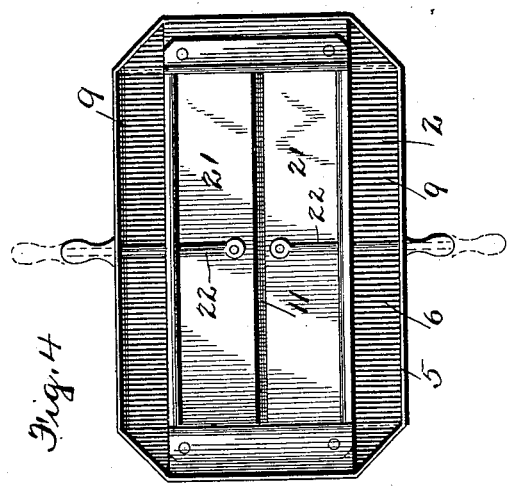
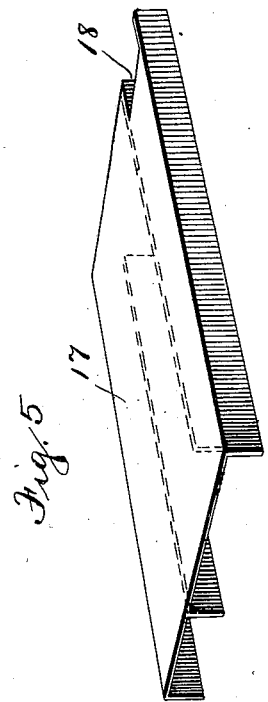
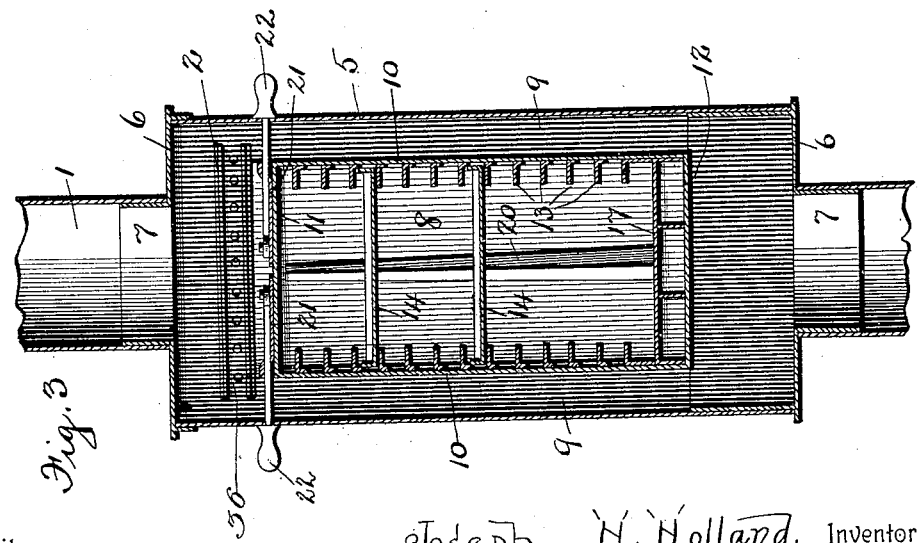
Witnesses:
Joseph H. Holland, Inventor
By Marion Marion
His Attorneys

UNITED STATES PATENT OFFICE.

JOSEPH HENRY HOLLAND, OF CENTRETON, CANADA.

FRUIT-EVAPORATOR.

SPECIFICATION forming part of Letters Patent No. 642,693, dated February 6, 1900.

Application filed February 23, 1899. Serial No. 706,551. (No model.)

*To all whom it may concern:*

Be it known that I, JOSEPH HENRY HOLLAND, a subject of Her Majesty the Queen of Great Britain, residing at Centreton, county of Northumberland, Province of Ontario, Canada, have invented certain new and useful Improvements in Fruit-Evaporators, (for which I have obtained Canadian Patent No. 62,126, dated December 20, 1898;) and I do hereby declare the following to be a full, clear, and exact description of the invention, such as will enable others skilled in the art to which it appertains to make and use the same.

My invention relates to fruit-evaporators. The object of my invention is to provide a device of this character which can be readily adjusted to or taken from the ordinary stovepipe, the fruit contained in said evaporator being subjected at all times to the effects of the heated air which passes through the stovepipe, and yet which will be kept free from extraneous matter, such as dust, soot, &c.

To these ends my invention consists in the improved construction and combination of parts, as hereinafter fully described, and particularly pointed out in the appended claims.

In the drawings, in which similar numerals of reference indicate similar parts in all of the views, Figure 1 is a perspective view of my improved evaporator mounted in position on a stovepipe. Fig. 2 is a vertical sectional view of the same. Fig. 3 is a vertial sectional view of the evaporator, the section being taken at right angles to that shown in Fig. 2. Fig. 4 is a top plan view of the evaporator shown in Fig. 3, the cover being removed. Fig. 5 is a detail view showing the device for raising the temperature of the air before it is passed into the evaporating-chamber.

In the evaporating of fruits several methods are used, among which is the common form of placing the fruit in suitable receptacles and then subjecting it to the action of the sun; but this method is one which is exceedingly slow and in which the fruit cannot be protected from the deposit of dust, &c. Another method is to place the fruit in closed receptacles and subject it to the action of artificial heat, which evaporates all the moisture from the fruit. The latter is the preferred method; but in devices of this kind it is generally necessary that special fires, &c., are required to perform the operation. This makes the evaporating of the fruit, excepting in extremely large quantities, a matter of considerable cost, which leaves the owner of the fruit but very little, if any, profit for his work. To overcome these disadvantages and to provide a device or series of devices which can be used to evaporate fruit economically, I provide the constructions shown in the drawings and hereinafter described, these constructions being intended to be used in connection with the ordinary stovepipe or smoke-flue of the kitchen-stove, which is generally provided with a fire, the construction being arranged to fit in and form part of the stovepipe.

In the drawings, 1 designates a stovepipe in which is mounted the evaporators. The evaporator 2 consists of a casing 5, having its upper and lower ends 6 removably secured thereto, said ends being provided with suitable pipe extensions 7, by means of which the casing becomes part of the pipe or flue. Within the casing 5 is mounted the evaporating-chamber 8, which is preferably formed as shown in Figs. 2 and 3, it being located, preferably, in the center of the casing 5 and of less width than the lateral width of the casing 5, thus providing suitable flues 9 for the passage of the smoke and heated air. The evaporating-chamber 8 is formed by two vertical plates 10, which extend from the front to the rear of the casing 5, and also the top 11 and bottom 12, each of which is inclined upwardly from the rear to the front of the evaporator. Each of the plates 10 is provided with a series of slides 13, which are arranged at the same inclination as the top and bottom and which are adapted to receive the fruit-trays 14, which may be, if desired, corrugated, as shown in Fig. 2; but this form of tray is not essential, as the device will operate with the ordinary form of tray.

The front of the evaporating-chamber is closed by means of a door 15, which is preferably formed inclined, as shown in Fig. 2, the top being provided with a hinged cover 16, which serves to allow of the escape of moisture, steam, &c., in regulated quantities. The bottom of the chamber 8 is provided with a removable plate 17, to the under side of which are secured suitable longitudinal flanges, preferably arranged as shown in Fig. 5, it being seen that by this construction a passage-way is formed from the front end of the plate rearward, then forward, and again rearward, where an opening 18 is formed in the plate for the passage of air, which is passed into the passage-way through a suitable sliding door 19, formed in the door 15, opposite the commencement of the passage-way. An extension 20 is secured to the top of the plate 17 and extends upwardly and forms a stop for the rearward movement of the trays 14. Suitable dampers 21 are slidably mounted on the top 11, each damper being operated by a suitable handle 22, extending outward through the casing 5, the dampers being adapted to regulate the passage of the smoke and heated air through the flues 9. It will be readily seen from this construction that after the fruit has been placed in the evaporator, the door of which can be opened without disturbing the passage of the smoke and heated air, the slide-door 19 is opened a proper distance, which allows of the passage of the outer air into the passage-way formed beneath the plate 17 and during its passage through this passage-way becomes heated by reason of the action of the heated air on the bottom 12, so that when the air is passed into the evaporating-chamber through the opening 18 it will be practically of as great a heat as the heated air which passes upward alongside of the evaporating-chamber through the flues 9. The door 16 can, if desired, be slightly opened, which will allow of the escape of steam, &c.; but this door is preferably kept closed until the heated air has been turned into steam. The inclination of the top 11 and bottom 12 and of the trays 14 has a tendency to turn the steam, &c., which is formed upward toward the door 16.

It will be readily seen that the evaporator 2 may be used for the purpose of a heater or heating-drum by simply opening the slide-door 19, partially closing the dampers, and opening the door 16. As the evaporating-chamber is subjected to the action of the heat on all its sides, the air contained therein will be quickly heated and thrown into the room in which the evaporator is located.

The evaporator 3, like the evaporator 2, is adapted to form a portion of the stovepipe or flue and comprises a flared portion 23, having an upwardly-turned corrugated flange 24. The flared portion 23 is adapted to receive a plate 25, having an upwardly-extending flanged portion 26, to which the stovepipe or flue is adapted to be attached. The plate 25 is adapted to receive the fruit to be evaporated or, if desired, to receive suitable trays containing the fruit, either form of use being equally desirable. A sectional cover 27 is placed around the flanged portion 26, said cover being adapted to rest on the plate 25 and having its periphery corrugated in a manner similar to the corrugations on the flared portion 23.

The construction of the evaporator 4 is somewhat different from the other evaporators shown in that it is detachably secured to the periphery of the stovepipe or flue. This arrangement is secured by means of an encircling band 28, which is provided with suitable recesses, within which and between the stovepipe 1 and the band 28 are adapted to be removably secured suitable radial arms 30, said arms being provided with downwardly-extending flanges 31, which pass into the said recesses, while the outer end of said arms is provided with an upturned flange 32 to prevent the evaporating-pans from being accidentally moved off of their supporting-arms. The top of the section 34 is normally closed by means of a suitable flared cover 35, said cover being secured and provided with a suitable fastening means, by means of which it can be readily attached to the stovepipe or detached, as may be desired, or when it is desired to inspect the fruit being evaporated the cover may be moved upward on the pipe, thus allowing of a ready inspection of the contents.

It is obvious that with the constructions shown a very economical system of evaporating fruits is provided, which system can be put in use at but practically small expense and without any additional cost for heat.

Having thus described my invention, what I claim as new is—

1. An evaporator comprising a casing; an evaporating-chamber located within said casing; flues formed on opposite sides of said evaporating-chamber, said flues having a casing common inlet and outlet to and from said casing; a sinuous passage-way formed at the bottom of said chamber and independent thereof, said passage-way having its front end connected to the outer air, and having its inner end connected to said chamber; a door from said chamber; a slide-door mounted in said door, in juxtaposition to said sinuous passage-way, said slide-door allowing of a regulating of the amount of air passed into said chamber; and a hinged door secured to the top of said door to allow of the escape of the steam formed in said chamber during evaporization, substantially as described.

2. An evaporator comprising a casing; an evaporating-chamber located within said casing, said chamber being formed at an upward inclination toward the front of said casing; flues formed on opposite sides of said evaporating-chamber, said flues having a common inlet and outlet to and from said casing; a sinuous passage-way formed at the bottom of said chamber and independent thereof, said passage-way having its front end connected to the outer air and having its inner end connected to said chamber; a door for said chamber; a slide mounted in said door in juxtaposition to said sinuous passage-way, said slide-door allowing of a regulating of the amount of air passed into said chamber; and a hinged door secured to the top of said door to allow of the escape of the steam formed in said chamber during evaporization, substantially as described.

In witness whereof I have hereunto set my hand in the presence of two witnesses.

JOSEPH HENRY HOLLAND.

Witnesses:
WM. KERR,
FREDRICK BERTRAM CLIMO.